June 24, 1924.
E. M. RYAN
AUTOMOBILE SIGNAL
Filed June 18, 1923
1,498,696
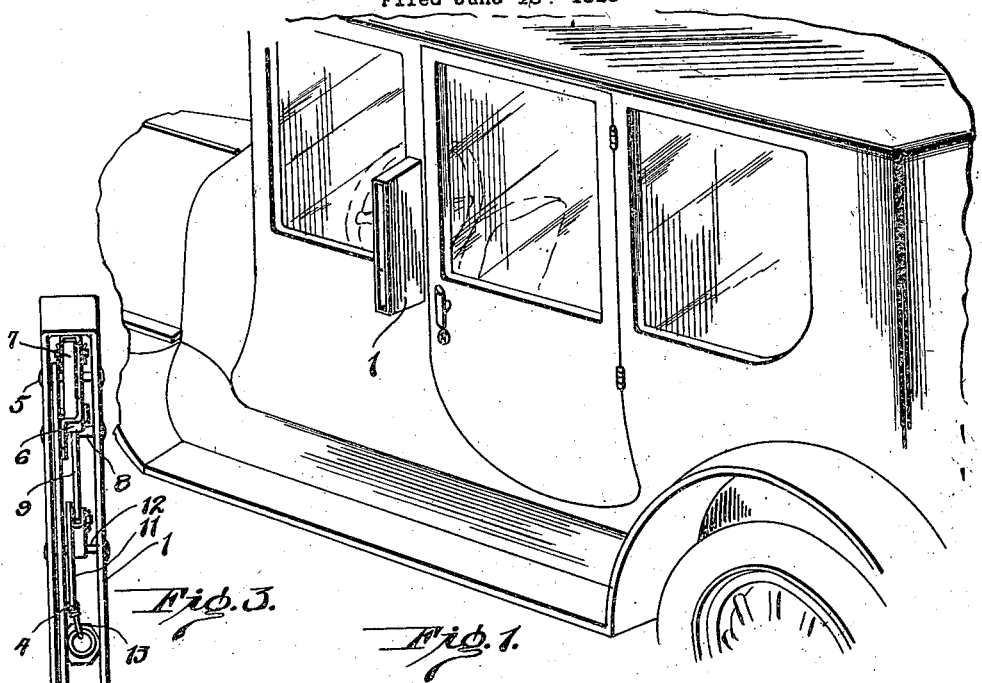
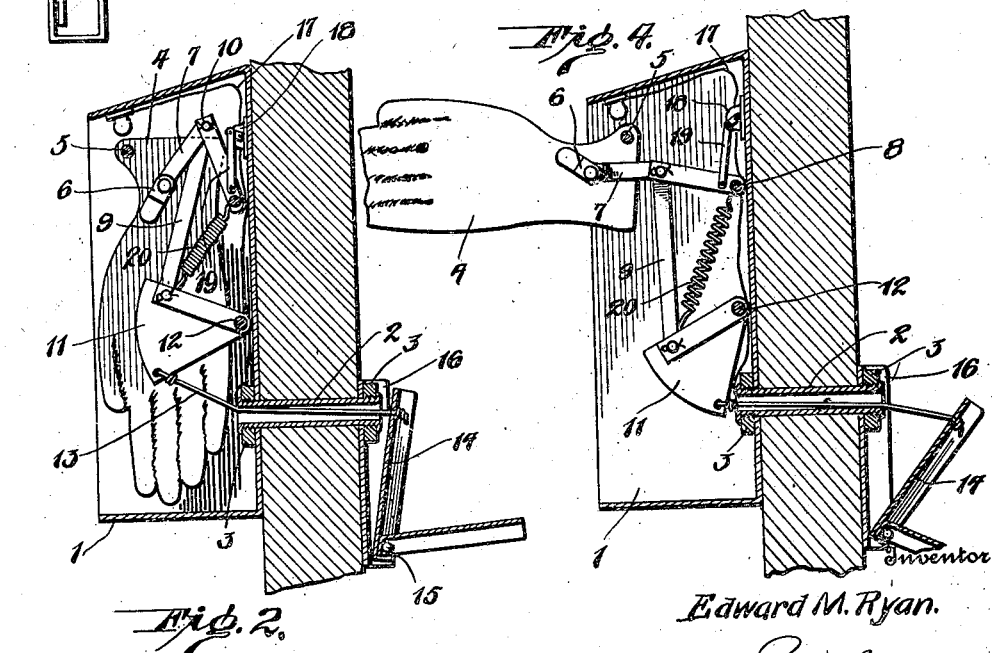
Edward M. Ryan.
By Roland T. Booth
Attorney Patented June 24, 1924.

1,498,696

UNITED STATES PATENT OFFICE.

EDWARD M. RYAN, OF CANANDAIGUA, NEW YORK, ASSIGNOR OF ONE-HALF TO LEE N. SMITH.

AUTOMOBILE SIGNAL.

Application filed June 18, 1923. Serial No. 646,017.

*To all whom it may concern:*

Be it known that EDWARD M. RYAN, a citizen of the United States, residing at Canandaigua, in the county of Ontario and State of New York, has invented certain new and useful Improvements in Automobile Signals, of which the following is a specification.

This invention relates to automobile signals of the type having a pivoted signal member concealed in a casing and adapted to be projected in a manner resembling the hand from the casing.

An object of the invention is to provide a signal having a signal member formed and colored like a hand which is normally concealed in a casing containing mechanism adapted for operation to project the signal member when it is desired to give a signal, as with the hand.

Another object of the invention is to provide a special operating mechanism for the signal member concealed in the casing constructed to operate the signal member with little effort.

The invention includes other objects and details of construction which are pointed out in detail in the following description and claims and shown in the drawings, in which—

Figure 1 is a perspective view of a portion of an automobile showing the device applied thereto, Figure 2 is a sectional view through the device itself with the parts in inoperative position, Figure 3 is an end elevation of the invention, and Figure 4 is a sectional view similar to Fig. 2 with the parts in operative or signalling position.

—1— indicates a casing secured to the side of an automobile near the driver such as shown in Fig. 1 by a tubular member —2— which extends through the casing to the side of the automobile and is provided with nuts —3— having threaded engagement with the member for locking the parts together. A signal member —4— which resembles the human hand is pivoted at —5— in the upper end of the casing and provided at —6— with an offset lug adapted to form a pivotal connection with one arm of the toggle member —7— the other arm of the toggle member is pivoted in the rear portion of the casing at —8— and a link —9— is connected at —10— with the joint of the toggle member —7—, the other end of the link being pivotally connected with one corner of the quadrant —11— which is pivotally mounted in the casing at —12—. A flexible member —13— is connected with the other corner of the quadrant and extends through the tubular member —2— to the inside of the automobile where it is connected with one arm of an operating lever —14— pivotally mounted at —15— in the flange plate —16— which is secured to the side of the body through one of the nuts —3— engaging the tubular member —2—, the lever —14— being of bell-crank form and the other arm being located in such a position that it may be easily operated by the elbow of the driver of the automobile without removing his hand from the wheel.

In order to make this signal useful at night time, a lamp —17— is mounted in the upper end of the casing and controlled by a switch —18— which is operated through a link connection —19— with the toggle member —7— as clearly shown in Figures 2 and 4. Any suitable source of current may be used for lighting the lamp, circuit through which will be closed only when the signal arm is in signalling position as shown in Figure 4 through the operation of the link —19— by the toggle member —7—.

Although the signal member will generally return to the non-signalling position by gravity it is desirable to provide additional means for insuring this movement after the operating lever is released which is here shown as a spring —20— connected at one end with the pivot —8— and at the other end with the quadrant —11— normally operating to break the joint in the toggle member and thereby pull the hand downwardly into the casing into concealed and non-signalling position therein.

As shown in Figure 1 it will be noted that this signal is in a position approximating that of the human hand when the driver is signalling an intended movement of his car and that the signal member is formed to imitate a human hand and painted the color thereof so that it will resemble the human hand as closely as possible and make it appear as if the driver of the vehicle was actually holding his hand out when the signal arm is in signalling position. It will be further noted that the tubular member —2— efficiently mounts the casing and the flange plate to the side of the automobile and so adapts the construction for application either with a closed or an open automobile and in either case the operating lever —14— will be in a position for convenient operation by the elbow of the driver when it is desired to raise the signal member into signalling position.

By the use of the toggle member —7— a system of leverage is produced which enables the convenient mounting within the casing in a comparatively small space which is not only desirable but necessary and which gives greater ease of operation of the signal member by the differences in leverage between the operating lever and the signal member.

What is claimed is:

1. An automobile signal comprising a casing, a signal member pivoted therein and adapted to be projected beyond the casing into signalling position, a toggle member connected with the signal member and the casing and means connected with the joint of said toggle member adapted to operate said member to project the signal member into signalling position.

2. An automobile signal comprising a casing, a signal arm pivotally mounted in the casing and adapted to be concealed thereby or projected into signalling position beyond the casing, a toggle member connected with the signal member and the casing, a quadrant pivoted in the casing, a link connected with one corner of the quadrant and the joint of the toggle member, and operating means connected with the other corner of the quadrant and extending substantially at right angles thereto for operating the signal arm through the quadrant, link and toggle member.

3. An automobile signal comprising a casing, a signal arm pivotally mounted in the casing and adapted to be concealed thereby or projected into signalling position beyond the casing, a toggle member connected with the signal member and the casing, a quadrant pivoted in the casing, a link connected with one corner of the quadrant and the joint of the toggle member, resilient means connected with the quadrant for returning the signal member to its concealed position, a tubular member extending through the casing, means cooperating with the tubular member for securing the casing to an automobile, and an operating cable extending through the tubular member and attached to the quadrant adapted to be operated to project the signal member into signalling position.

4. An automobile signal comprising a casing adapted to fit against the side of an automobile, a signal member pivoted therein, a plate adapted to fit on the inside of the automobile, a tubular member extending through the side of the automobile, the plate and casing, means cooperating with the tubular member for securing the plate and casing to the side of the automobile, an operating lever carried by the plate and means connected with the operating lever and signal arm whereby the signal arm may be projected into signalling position through operation of the operating lever.

In testimony whereof I affix my signature.

EDWARD M. RYAN.